United States Patent
Spagnolo et al.

(10) Patent No.: US 11,815,067 B2
(45) Date of Patent: Nov. 14, 2023

(54) OPERATION OF A WIND TURBINE DURING START-UP TO REDUCE LIMIT CYCLES

(71) Applicant: VESTAS WIND SYSTEMS A/S, Aarhus N. (DK)

(72) Inventors: Fabio Spagnolo, Aarhus C (DK); Julio Xavier Vianna Neto, Aarhus N (DK); Karthik Vasudevan, Viby J (DK); Naga Srinivas Kamarajugadda, Vishakapatnam (IN); Fabio Caponetti, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/843,522

(22) Filed: Jun. 17, 2022

(65) Prior Publication Data
US 2022/0403819 A1 Dec. 22, 2022

(30) Foreign Application Priority Data

Jun. 17, 2021 (DK) .......................... PA 2021 70306

(51) Int. Cl.
*F03D 7/02* (2006.01)
(52) U.S. Cl.
CPC .......... *F03D 7/026* (2013.01); *F05B 2270/32* (2013.01); *F05B 2270/327* (2013.01)
(58) Field of Classification Search
CPC ............ F05B 2270/32; F05B 2270/327; F05B 2270/3202
See application file for complete search history.

(56) References Cited

U.S. PATENT DOCUMENTS

| 7,629,702 | B2 * | 12/2009 | Schubert ............... F03D 7/0224 290/55 |
| 9,186,378 | B2 * | 11/2015 | Reichard ................ A61N 5/062 |
| 2011/0140423 | A1 * | 6/2011 | Menke .................... F03D 15/10 416/37 |

FOREIGN PATENT DOCUMENTS

| CN | 109441723 A | 3/2019 | |
| EP | 2056210 A2 | 5/2009 | |
| EP | 2910777 A1 | 8/2015 | |
| EP | 3076012 A1 | 10/2016 | |
| EP | 3141744 A1 * | 3/2017 | ........... F03D 7/0224 |

(Continued)

OTHER PUBLICATIONS

European Patent Office, European Search Report for European Patent Application No. 22178963.9-1002, dated Nov. 23, 2022.

(Continued)

*Primary Examiner* — Sabbir Hasan
*Assistant Examiner* — Joshua R Beebe
(74) *Attorney, Agent, or Firm* — Patterson + Sheridan, LLP

(57) ABSTRACT

The invention relates to a method for controlling a wind turbine during start up, from a non-producing operation mode to a power producing operation mode when limit cycles occur during start-up. Limit cycles are detected when a number of cut-in transitions or a number of cut-out transitions are detected. A cut-in transition is when the wind turbine fails starting up despite having the wind speed or rotor speed normally required to enter a power producing operation mode. A cut-out transition is occurring when the wind turbine is falling out of power producing operation mode after having entered the power producing operation mode.

18 Claims, 6 Drawing Sheets

(56) References Cited

FOREIGN PATENT DOCUMENTS

| | | | |
|---|---|---|---|
| EP | 3141744 | A1 | 3/2017 |
| EP | 3628860 | A1 | 4/2020 |

OTHER PUBLICATIONS

Danish Patent and Trademark Office, First Technical Examination including the Search Report for Application PA 2021 70306 dated Dec. 16, 2021.

* cited by examiner

OPERATION OF A WIND TURBINE DURING START-UP TO REDUCE LIMIT CYCLES

FIELD OF THE INVENTION

The present invention relates to a method for controlling a wind turbine during start up, more particular for controlling a wind turbine during start-up from a non-producing operation mode to a power producing operation mode when limit cycles occur during start-up.

BACKGROUND OF THE INVENTION

When a wind turbine is starting up from a non-producing operation mode to a power producing operation mode, limit cycles may occur due to the available energy in the wind not being sufficiently high over time for maintaining the wind turbine operation. The wind turbine may attempt to start-up, when the wind speed under normal conditions is sufficient high for stable power generation, but due to circumstances, like ice on the rotor blades or wind fluctuations, stable operation may not be possible, and the wind turbine may fall back to freewheeling.

Hence, an improved start-up method would be advantageous, and in particular a more efficient and/or reliable start-up for handling difficult circumstances, when the wind turbine is unable to initiate power production or falls out of power production, would be advantageous.

SUMMARY OF THE INVENTION

It is an object of the present invention to provide an improved start-up method. In particular, it may be seen as an object of the present invention to provide a method that reduces and minimizes the above mentioned problems of the wind turbine being unable to initiate power production or obtain stable power production.

The above described object and several other objects are intended to be obtained in a first aspect of the invention by providing a method for operating a wind turbine during start-up from a non-producing operation mode to a power producing operation mode, the method comprising the steps of:
 a) setting a nominal cut-in value of a first operational parameter and a connection cut-in value of a second operational parameter of the wind turbine,
 b) monitoring the first operational parameter,
 c) initiating start-up of the wind turbine when the monitored first operational parameter is higher than the nominal cut-in value,
 d) monitoring the second operational parameter,
 e) detecting a cut-in transition if the value of the second operational parameter is not reaching the connection cut-in value within a start-up time period or the first operational parameter falls below the nominal cut-in value,
 f) detecting a cut-in limit cycle of the wind turbine if more than a threshold number of counted cut-in transitions has been detected, and if a cut-in limit cycle is detected, increase the nominal cut-in value, and
 g) repeating steps b)-f) until the second operational parameter reaches the connection cut-in value.

During start-up, a first operational parameter and a second operation parameter are monitored. The first operational parameter typically is the wind speed and the second operational parameter typically is the rotor speed. When the first operational parameter is higher than a nominal cut-in value start up of the wind turbine is initiated, and when the second operational parameter is higher than a connection cut-in value the wind turbine enters a power producing operation mode.

A limit cycle is when a wind turbine is attempting to start up repeatedly and fails to do so. The wind turbine may try to ramp up in speed, but it fails to get a sufficient high speed to initiate power generation, and is therefore falling back to freewheeling, this cycle being repeated multiple times. The cut-in limit cycle is when the wind turbine multiple times attempts to start-up, because the first operational parameter is reached, and repeatedly fails to initiate power generation. The first operational parameter may be the wind speed or the rotor speed, and when the wind speed or the rotor speed is sufficiently high, the wind turbine attempts to start up. But, due to circumstances like icing on the blades or changes in wind speed or wind direction, the wind turbines may fail to start generating power in a stable manner. Even if an attempt to start up fails, the wind turbine may immediately make a new attempt because the first operational parameter still is higher than the nominal cut-in value.

When the first operational parameter is higher than the nominal cut-in value, the wind turbine monitors the second operational parameter, typically the rotor speed. If the wind turbine fails for the second operational parameter to reach and become larger than the connection cut-in value within a start-up time period, a cut-in transition is detected. A cut-in counter counts the number of cut-in transitions. When cut-in transitions repeats several times, more than a threshold number of counted cut-in transitions, a cut-in limit cycle has been detected. The threshold number of counted cut-in transitions may be stored in the control system and may be called a cut-in cycle maximum. A limit cycle may be a cycle of two or more attempts to reach stable operation.

When a cut-in limit cycle has been detected, the nominal cut-in value is increased, which is increasing the requirement the wind turbine must fulfil before it attempts starting up again, and thereby reducing the risk of entering a new cut-in limit cycle.

The invention is particularly, but not exclusively, advantageous for obtaining a start-up method that reduces the number of cut-in transitions by increasing the nominal cut-in value, when cut-in limit cycles are detected. By increasing the cut-in value, the energy available in the wind before attempting starting up must be higher, and the chances for a successful start-up, without detecting further limit-cycles, will be increased.

The wind turbine comprises a first operational parameter and a second operational parameter. The first operational parameter may be the wind speed or the rotor speed. An anemometer mounted on the nacelle may monitor the wind speed. A rotor speed detector, which may be placed on the tower, monitors the rotor speed and the rotor speed is dependent on the pitch angle of the rotors during freewheeling. When the first operational parameter is higher than a nominal cut-in value, start-up of the wind turbine is initiated. This is for example when the monitored wind speed is higher than the nominal cut-in value.

When starting a wind turbine, which is not running due to insufficient wind, the first operational parameter, which may be the wind speed or the rotor speed, is monitored, and when the nominal cut-in value is reached, the wind turbine is allowed to start up. The rotor blades then accelerates until the second operational parameter, which may be the rotor speed, reaches the connection cut-in value. Then the wind turbine starts producing power.

However, due to circumstance like ice on the blades or fluctuations in wind speed or wind direction the wind turbine may have difficulties in starting up. Even when the first operational parameter is higher than the nominal cut-in value, the wind turbine may be unable to achieve that the second operational parameter becoming higher than the connection cut-in value.

The control parameters related to the cut-in strategy are tuned based on a trade-off between the limit cycles and the wind speed limit or rotor speed limit for the turbine to start-up. However, such tuning is made based on nominal aerodynamic performance of the rotor, and under degradation or the rotor, e.g. due to icing, other parameters values may be required.

When start-up has been initiated, the second operational parameter is monitored. The second operational parameter may be the rotor speed. The connection cut-in value may then be the minimum rotor speed required for the wind turbine to enter a power production operation mode.

If start-up has been initiated, because the nominal cut-in value has been reached, but the wind turbine is unable to reach the connection cut-in value within a start-up time period, which as an example may be 180 seconds, or the first operational parameter falls below the nominal cut-in value, then a cut-in transition is detected. If the first operational parameter remains higher than the nominal cut-in value or again increases to a value higher than the nominal cut-in value, the wind turbine again initiates start-up. If again a start-up time period expires without the second operational parameter reaching the connection cut-in value, a second cut-in transition is detected. The wind turbine counts the number of cut-in transitions by the cut-in counter, and if this continues and the wind turbine after detecting and counting more than the allowed threshold number of counted cut-in transitions, the cut-in cycle maximum, a cut-in limit cycle is detected and the wind turbine increases the nominal cut-in value.

By increasing the nominal cut-in value, the requirement for initiating a start-up of the wind turbine is increased. If the first operational parameter is the wind speed, this requires that the monitored wind speed must be higher before the start-up is initiated. This reduces the risk for detecting another cut-in limit cycle.

The wind turbine continues repeating the steps b)-f) until the second operational parameter reaches the connection cut-in value.

According to an embodiment, the method further comprises the steps of:

h) entering a power producing operation mode of the wind turbine upon reaching the connection cut-in value of the second operational parameter, i) monitoring the operational state of the wind turbine, and j) detecting a cut-out transition upon transition into a non-producing operation mode or within a connection time period after transition into a non-producing operation mode not reaching a power producing operation mode, k) detecting a connection limit cycle of the wind turbine if more than a threshold number of counted cut-out transitions has been detected, and if a connection limit cycle is detected, increase the connection cut-in value, l) repeating step b)-f) after detecting a cut-out transition until the second operational value reaches the connection cut-in value, m) entering a power producing operation mode of the wind turbine, and n) repeating steps i)-l) until no cut-out transition has been detected within a timeout-period after which the wind turbine enters normal operation.

When the second operational parameter reaches the connection cut-in value, the wind turbine enters a power producing operation mode. However, circumstances, like ice on the blades or fluctuation in wind speed or wind direction, may cause the wind turbine to fall out of power production. The wind turbine falls out of power production if a minimum required power production can not be sustained. In this case, the wind turbine may enter a non-producing operation mode and production may be closed down, alternatively, the wind turbine may attempt to increase power production to fulfil the minimum required power production requirement within a connection time period, which may be 2 to 5 minutes, before the wind turbine enters the non-producing operation mode.

A connection limit cycle is when the wind turbine multiple times enters the power producing operation mode, but repeatedly falls out of the power producing operation mode because it cannot sustain a sufficient high power generation.

If the wind turbine falls out of the power producing operation mode and enters the non-producing operation mode, a cut-out transition is detected and counted by a cut-out counter. The wind turbine in this case will attempt to initiate start-up again, if the first operational parameter is higher than the nominal cut-in value and the second operational parameter is higher, or again becomes higher, than the connection cut-in value. If power production is reestablished and again the wind turbine falls out of power production, a second cut-out transition is detected and counted.

The wind turbine counts the number of cut-out transitions by the cut-out counter, and if the wind turbine, after counting the detection of more than a threshold number of counted cut-out transitions, detects a connection limit cycle, the wind turbine increases the connection cut-in value. The threshold number of counted cut-out transitions is stored in the control system and may be called a connection cycle maximum.

The connection cut-in value may be increased in steps, it may be increased with 2%, 2.5%, 3%, 4%, 5% or any other suitable step, or it could be increased according to the optimal rotor speed as a function of the current wind speed. This function may be a linear function of the wind speed.

By increasing the connection cut-in value, the requirement for the wind turbine to enter a power producing operation mode is increased. If the second operational parameter is the rotor speed, this requires that the monitored rotor speed must be higher than the now increased connection cut-in value, before entering the power producing operation mode. This reduces the risk for attempting to enter a power producing operation mode until a stable power production is obtainable.

According to an embodiment, the method further comprises resetting the nominal cut-in value to its initial value upon detecting a connection limit cycle and the connection cut-in value is lower than a connection threshold.

The connection threshold is the maximum value allowed for the connection cut-in value. When a connection limit cycle is detected, the nominal cut-in value is reset to its initial value, if the connection cut-in value is lower than the connection threshold. The nominal cut-in value is not reset to its initial value, if the connection cut-in value is not lower than the connection threshold. The connection cut-in value is saturated when it has reached the connection threshold; therefore, the nominal cut-in value is not reset, to ensure the requirement for initiating start-up of the wind turbine, after a connection limit cycle has been detected, has been increased. When the connection cut-in value cannot be increased, because it has reached its maximum value, the nominal cut-in value may be increased instead. When the connection cut-in value is saturated the conditions for starting up the wind turbine are very difficult, and therefore the requirements for attempting to do so is increased.

According to an embodiment, the method further comprises increasing the nominal cut-in value upon detecting a connection limit cycle and the connection cut-in value is higher than or equal to the connection threshold.

When the connection cut-in value is saturated, and therefore is higher than or equal to the connection threshold, not only the nominal cut-in value is not reset, it may even be increased with a predefined amount or factor, so that the requirements for attempting starting up the wind turbine is even higher.

According to an embodiment, the method further comprises setting the nominal cut-in value to a nominal threshold upon detecting a cut-in limit cycle of the wind turbine and the nominal cut-in value is higher than or equal to the nominal threshold.

If increasing the nominal cut-in value and the nominal cut-in value reaches a value that is higher than the nominal threshold, then the nominal cut-in value is set to the nominal threshold, so that the nominal cut-in value is not allowed to be higher than the nominal threshold. The nominal threshold is a maximum for how much the nominal cut-in value may be increased to avoid too high a nominal threshold, if the wind turbine is not able to start-up when the nominal threshold is reached, it may be sign of the wind turbine is malfunctioning and need maintenance.

According to an embodiment, the method further comprises setting the connection cut-in value to a connection threshold upon detecting a connection limit cycle of the wind turbine and the connection cut-in value is higher than or equal to the connection threshold.

If increasing the connection cut-in value, the connection cut-in value reaches a value that is higher than the connection threshold, then the connection cut-in value is set to the connection threshold, so that the connection cut-in value is not allowed to be higher than the connection threshold. Instead, the nominal cut-in value may be increased, to increase the requirements for starting up the wind turbine.

According to an embodiment, the method further comprises resetting the nominal cut-in value and the connection cut-in value to their initial values when no cut-out transition has been detected within the timeout-period after which the wind turbine enters normal operation.

If the wind turbine is started up, and after a timeout-period not have detected any cut-out transition, meaning that no fall-out of production has been detected. Then the wind turbine it running according to plan and no more special start-up control is needed. Therefore, the nominal cut-in value and the connection cut-in value are reset to their initial values and the wind turbine enters normal operation.

According to an embodiment, the method further comprises that the counted cut-in transitions is reset to zero when a cut-in limit cycle is detected, or a cut-in limit cycle timer times out.

The cut-in counter counts the number of cut-in transitions. The cut-in counter is reset to zero, when a cut-in limit cycle is detected, to prepare the counter for counting cut-in transitions for detecting the next cut-in limit cycle. Also, when a cut-in transition is detected a cut-in limit cycle timer is started, and if the timer times out also the counter for counting cut-in transitions is reset to zero, as no cut-in limit cycle is developing. The cut-in limit cycle timer may be set to 600 seconds.

According to an embodiment, the method further comprises that the counted cut-out transitions is reset to zero when a connection limit cycle is detected or a connection limit cycle timer times out.

The number of cut-out transition are counted in the cut-out counter, and the cut-out counter is reset to zero when a connection limit cycle is detected to prepare the counter for counting cut-out transitions for detecting the next connection limit cycle. Also, when a cut-out transition is detected a connection limit cycle timer is started, and if the timer times out also the cut-out counter is reset to zero, as no connection limit cycle is developing. The connection limit cycle timer may be set to 600 seconds.

According to an embodiment, the method further comprises that the first operational parameter is the wind speed or the rotor speed, and the second operational parameter is the rotor speed.

When starting up the wind turbine, the first operational parameter typically may be the wind speed, but it may also be the rotor speed. The second operational parameter typically may be the rotor speed.

According to an embodiment, the method further comprises that the first operational parameter is the wind speed and the nominal cut-in value is initially set to 3, 4 or 5 m/s and when the first operational parameter is increased, it is increased with 1 m/s steps.

The nominal cut-in value, may be set to 3 m/s, but may also be set to 4 or 5 m/s or any other suitable value. When the first operational parameter is increased, it may be increased with 1 m/s steps, but may alternatively be increased with steps of 0.5 m/s, 1.5 m/s, 2 m/s or any other suitable value.

According to an embodiment, the method further comprises that the first operational parameter is the rotor speed and the nominal cut-in value is initially set to 0.5, 1, or 1.2 rpm, and when the first operational parameter is increased, it may be increased with 2.5% steps.

Alternatively, the first operational parameter may be the rotor speed. The nominal cut-in value may be set to 0.5, 1 or 1.2 rpm or any other suitable value. When the first operational parameter is increased, it may be increased with 2.5% steps, but may alternatively be increased with steps of 2%, 3%, 4%, 5% or any other suitable value.

According to an embodiment, the method further comprises that when the second operational parameter is the rotor speed the connection cut in value is initially set to 0.5, 1, or 1.2 rpm and when the second operational parameter is increased, it may be increased with 2.5% steps.

The second operational parameter may be the rotor speed. The connection cut-in value may be set to 0.5, 1 or 1.2 rpm or any other suitable value. When the second operational parameter is increased, it may be increased with 2.5% steps, but may alternatively be increased with steps of 2%, 3%, 4%, 5% or any other suitable value.

According to an embodiment, the method further comprises that the threshold number of cut-out transitions is 2, 3, 4, 5, 6 or 7.

The threshold number of cut-out transitions is the number of cut-out transition allowed, before a connection limit cycle is detected, the connection cycle maximum. The threshold number of cut-out transitions may be 5, but may be any suitable number.

According to an embodiment, the method further comprises that the threshold number of cut-in transitions is 2, 3, 4, 5, 6 or 7.

The threshold number of cut-in transitions is the number of cut-in transition allowed, before a connection limit cycle is detected, the cut-in cycle maximum. The threshold number of cut-in transitions may be 5, but may be any suitable number.

According to an embodiment, the method further comprises that the timeout-period after which the wind turbine enters normal operation is 2, 3, 4, 5 or 6 hours.

When the wind turbine stable has been producing power for a time period, the wind turbine enters normal operation. This may be after 2 hours, but may be after any suitable time period.

In a second aspect, the invention relates to a method for operating a wind turbine during start-up from a non-producing operation mode to a power producing operation mode, the method comprising the steps of:
- o) setting a connection cut-in value of a second operational parameter of the wind turbine,
- p) monitoring the second operational parameter,
- q) entering a power producing operation mode of the wind turbine upon reaching the connection cut-in value of the second operational parameter,
- r) monitoring the operational state of the wind turbine, and
- s) detecting a cut-out transition upon transition into a non-producing operation mode or within a connection time period after transition into a non-producing operation mode not reaching a power producing operation mode,
- t) detecting a connection limit cycle of the wind turbine if more than a threshold number of counted cut-out transitions has been detected, and if a connection limit cycle is detected, increase the connection cut-in value,
- u) repeating steps p)-t) until no cut-out transition has been detected within a timeout-period after which the wind turbine enters normal operation.

In this second aspect, cut-in limit cycles are not detected, only connection limit cycles are detected. A connection cut-in value for the second operational parameter is set, and the second operational parameter is monitored. The second operational parameter typically is the rotor speed. When starting up, the control system detects when the second operational parameter is reaching the connection cut-in value, and entering a power producing operation mode. The operational state of the wind turbine is monitored, and circumstance, like ice on the blades or fluctuation in wind speed or wind direction, may cause the wind turbine falling out of power producing operation mode. If this happens, a cut-out transition is detected and counted by a cut-out counter. The wind turbine in this case may attempt to enter power producing operation mode again, if, or when, the second operational parameter is higher than the connection cut-in value. If power production is reestablished and again the wind turbine falls out of the power producing operation mode, a second cut-out transition is detected and counted.

The wind turbine counts the number of cut-out transitions by a cut-out counter, and if the wind turbine, after counting the detection of more than a threshold number of counted cut-out transitions, the connection cycle maximum, detects a connection limit cycle, the wind turbine increases the connection cut-in value. The threshold number of counted cut-in transitions is stored in the control system as the connection cycle maximum.

By increasing the connection cut-in value, the requirement for the wind turbine to enter a power producing operation mode is increased. If the second operational parameter is the rotor speed, this requires that the monitored rotor speed must be higher before entering the power producing operation mode. This reduces the risk for attempting to enter a power producing operation mode until a stable power production is obtainable.

In a third aspect, the invention relates to a computer program product being adapted to enable a computer system comprising at least one computer having data storage means in connection therewith to control an wind turbine during start-up according to the first or second aspect of the invention, such as a computer program product comprising instructions which, when the program is executed by a computer, cause the computer to carry out the steps of the method of first or second aspect of the invention.

This aspect of the invention is particularly, but not exclusively, advantageous in that the present invention may be accomplished by a computer program product enabling a computer system to carry out the operations of the wind turbine of the first or second aspect of the invention when downloaded or uploaded into the computer system. Such a computer program product may be provided on any kind of computer readable medium, or through a network.

The individual aspects of the present invention may each be combined with any of the other aspects. These and other aspects of the invention will be apparent from the following description with reference to the described embodiments.

BRIEF DESCRIPTION OF THE FIGURES

The wind turbine according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
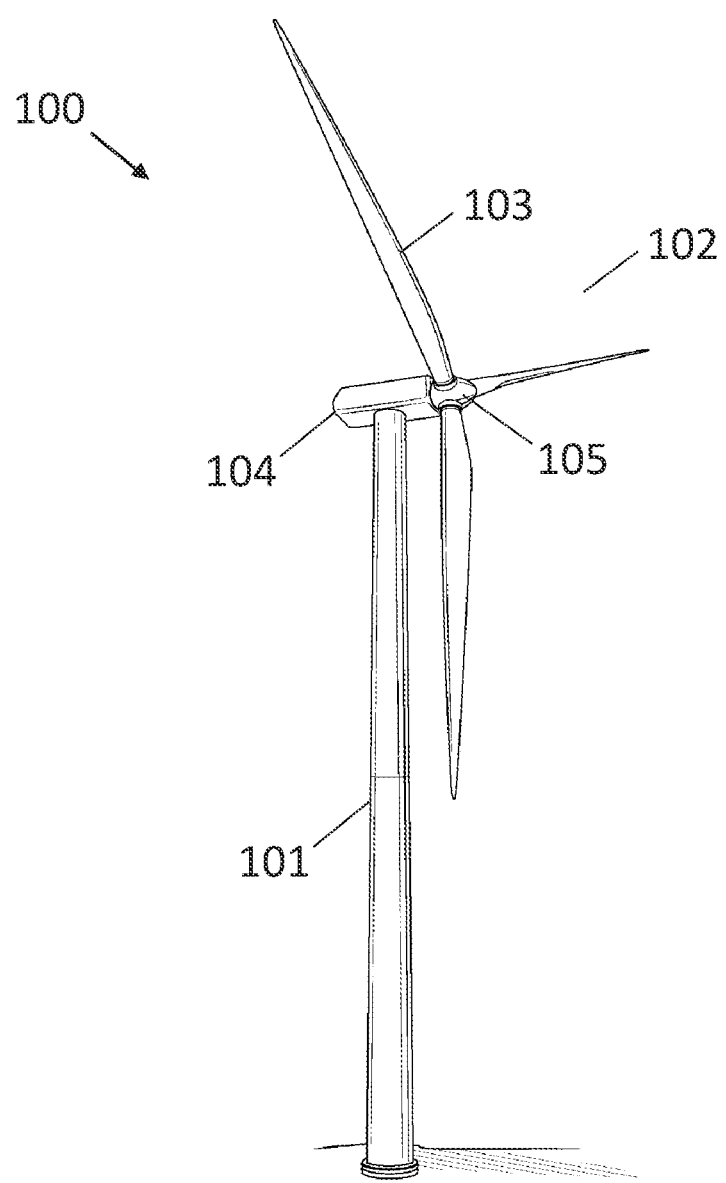
FIG. 1 illustrates a wind turbine.

FIG. 1 shows a wind turbine 100 (also commonly referred to as a wind turbine generator, WTG) comprising a tower 101 and a rotor 102 with at least one rotor blade 103. Typically, three blades are used, but a different number of blades can also be used. The blades 103 are connected with the hub 105, which is arranged to rotate with the blades. The rotor is connected to a nacelle 104, which is mounted on top of the tower 101 and being adapted to drive a generator situated inside the nacelle 104. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter. Moreover, the wind turbine 100 comprises a control system. The control system may be placed inside the nacelle 104, or distributed at a number of locations inside the turbine 100 and communicatively connected.

Figure 2:
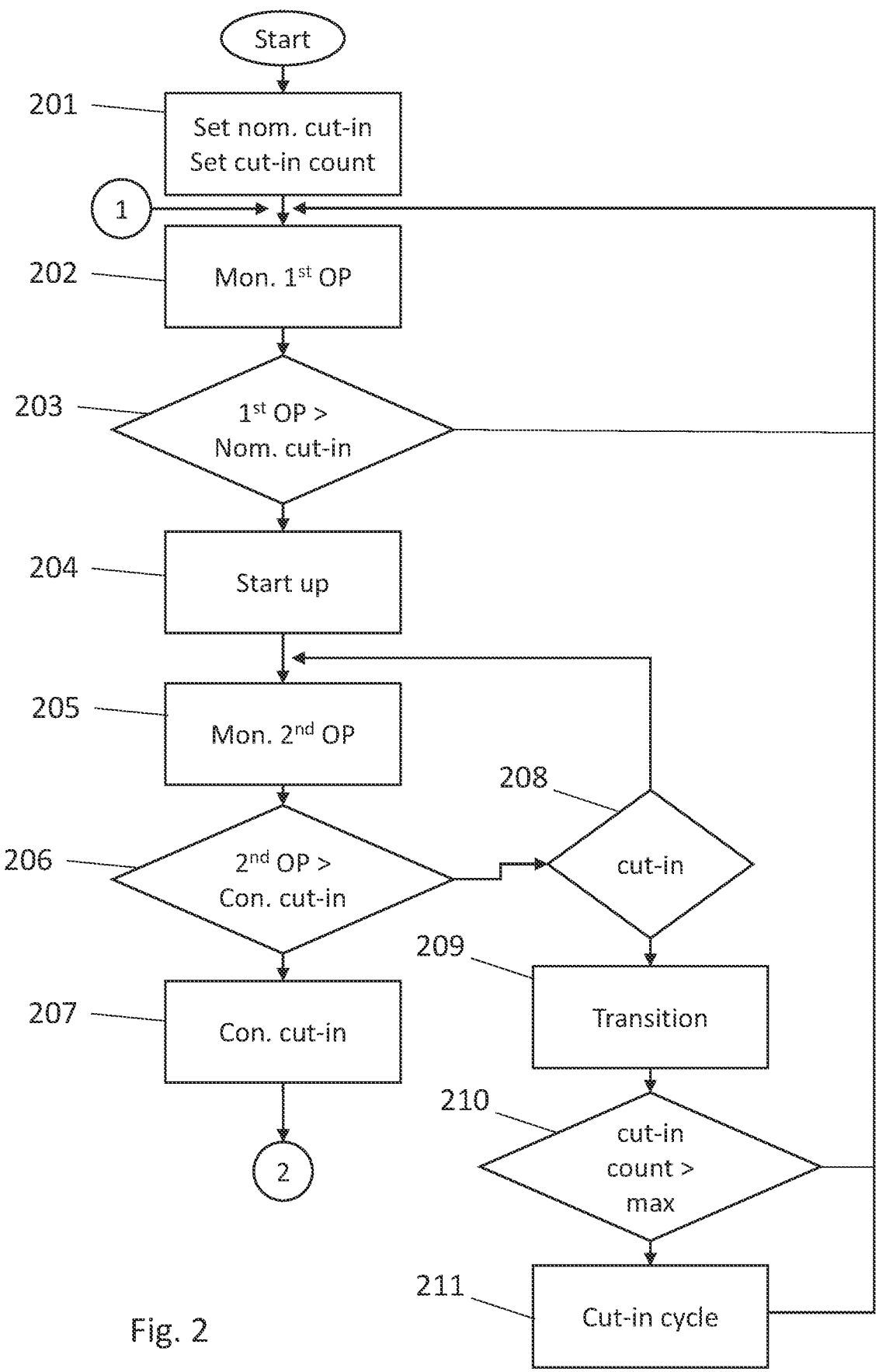
FIG. 2 is a flow chart illustrating the start-up of the wind turbine into a power producing operation mode.

FIG. 2 illustrates the start-up of the wind turbine. In the first step 201, the nominal cut-in value of the first operational parameter and the connection cut-in value of the second operation parameter is set to initial values. The first operational parameter typically is the wind speed and the nominal cut-in value for the first operational parameter may for instance be set to 3 m/s. Alternatively, the first operational parameter may be the rotor speed. The second operational parameter typical is rotor speed and the connection cut-in value of the second operational parameter may for instance be set to 0.5 rpm. Further the cut-in counter, used to count cut-in transitions, is set to zero.

In step 202, the first operational parameter is monitored. The monitoring is typically performed by the wind turbine control system. Then, in 203, when the first operational parameter is higher than the nominal cut in value, for instance when the measured wind speed is higher than 3 m/s, the wind turbine enters step 204 and initiates start-up.

Then in step 205, the second operational parameter is monitored. The second operational parameter typical may be rotor speed, and it is monitored by the control system by a rotor speed sensor. When, in 206, the second operational parameter is higher than the connection cut-in value, for instance, when the rotor speed is higher than 0.5 rpm, then step 207 is reached, the wind turbine is ready to enter power producing operation mode, and the method continues in FIG. 3.

However, if the condition, in 206, of the second operational parameter being larger than the connection cut-in value, is not fulfilled after a start-up time period 208, the start-up time period may typically be 180 seconds, a cut-in transition is detected in step 209. When a cut-in transition is detected, the cut-in counter is increased by 1, and if the condition, in 210, is fulfilled, the cut-in counter is higher than the allowed cut-in cycle maximum, then a cut-in limit cycle has been detected 211. When a cut-in limit cycle has been detected 211, the nominal cut-in value is increased, for instance by 1 m/s, and the cut-in counter is reset to zero and the control returns to step 202. The control returns to step 202 whether a cut-in limit cycle has been detected or not. When a cut-in transition has been detected, the control starts over to monitor the first operational parameter for when to make a new attempt to initiate start-up.

Figure 3:
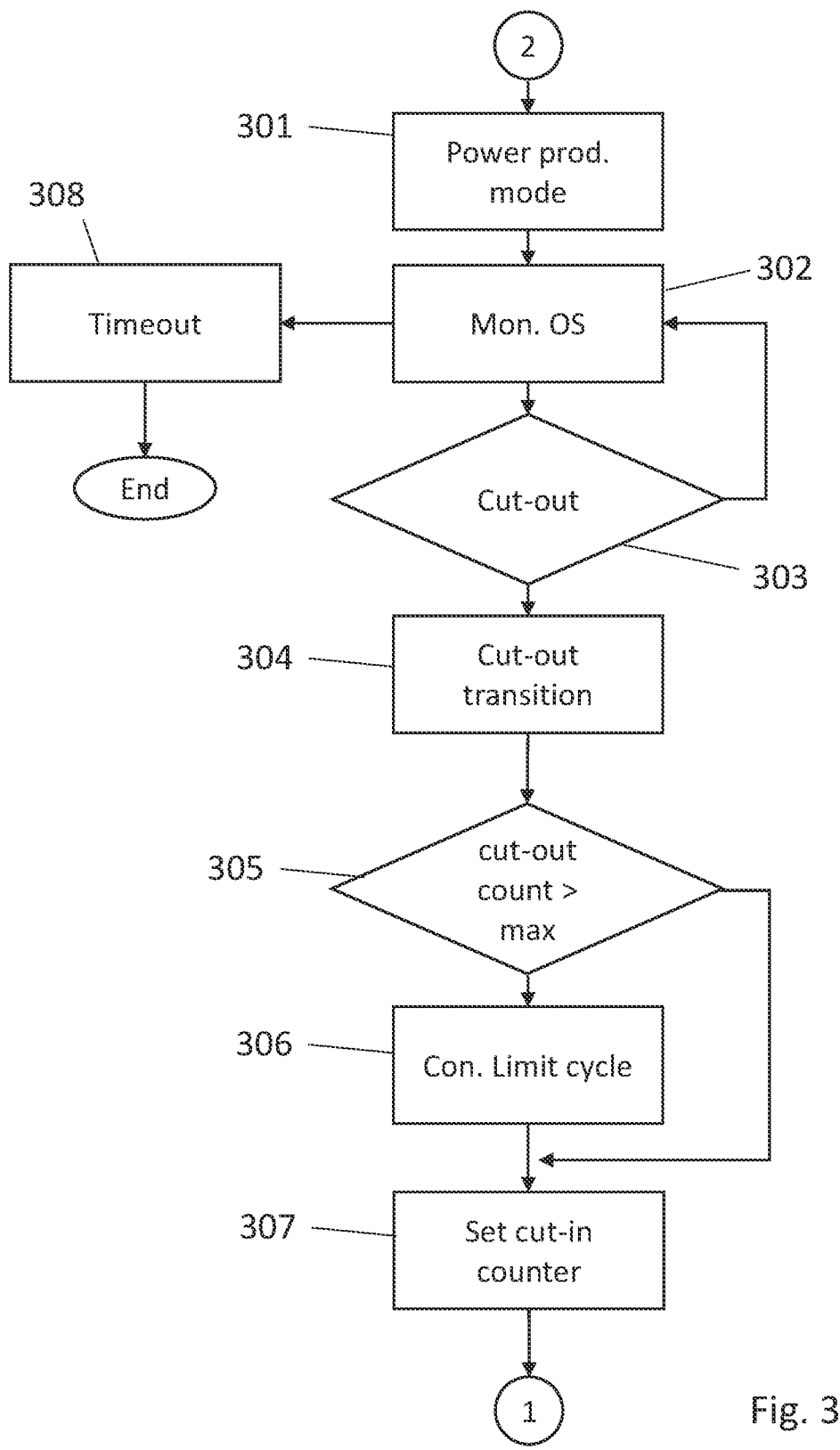
FIG. 3 is a flow chart illustrating the method after entering power producing operation mode.

FIG. 3 illustrates the method after the second operational parameter has reached the connection cut-in value and the wind turbine is ready to start up power production. In the first step 301 in FIG. 3, the wind turbine enters a power producing operation mode and starts to produce power for the utility grid. The cut-out counter is set to zero, ready to count cut-out transitions. In step 302, the operational state of the wind turbine is monitored, and if the wind turbine are unable to continue producing power, for instance due to changes in wind speed or wind direction, the wind turbine drops into a non-producing operation mode and a cut-out transition is detected 303. When a cut-out transition is detected, in step 304 the cut-out counter is increased by 1, and if, in 305, the cut-out counter is larger than the allowed connection cycle maximum, a connection limit cycle is detected 306, and the control returns to step 202. In step 306 the connection cut-in value is increased and the cut-out counter is reset to zero. After detecting a cut-out transition, the control returns to step 202 whether a connection limit cycle has been detected or not. When a cut-out transition has been detected, the control starts over monitoring the first operational parameter for when to make a new attempt to initiate start-up. Before returning to step 202 in FIG. 2, the cut-in counter is reset to zero 307.

If, when monitoring the operational state 302, no cut-out transition has occurred within a time-out period, which for instance may be 2 hours, a timeout occurs and the wind turbine enters normal operation, step 308, and the start-up is completed.

Figure 4:
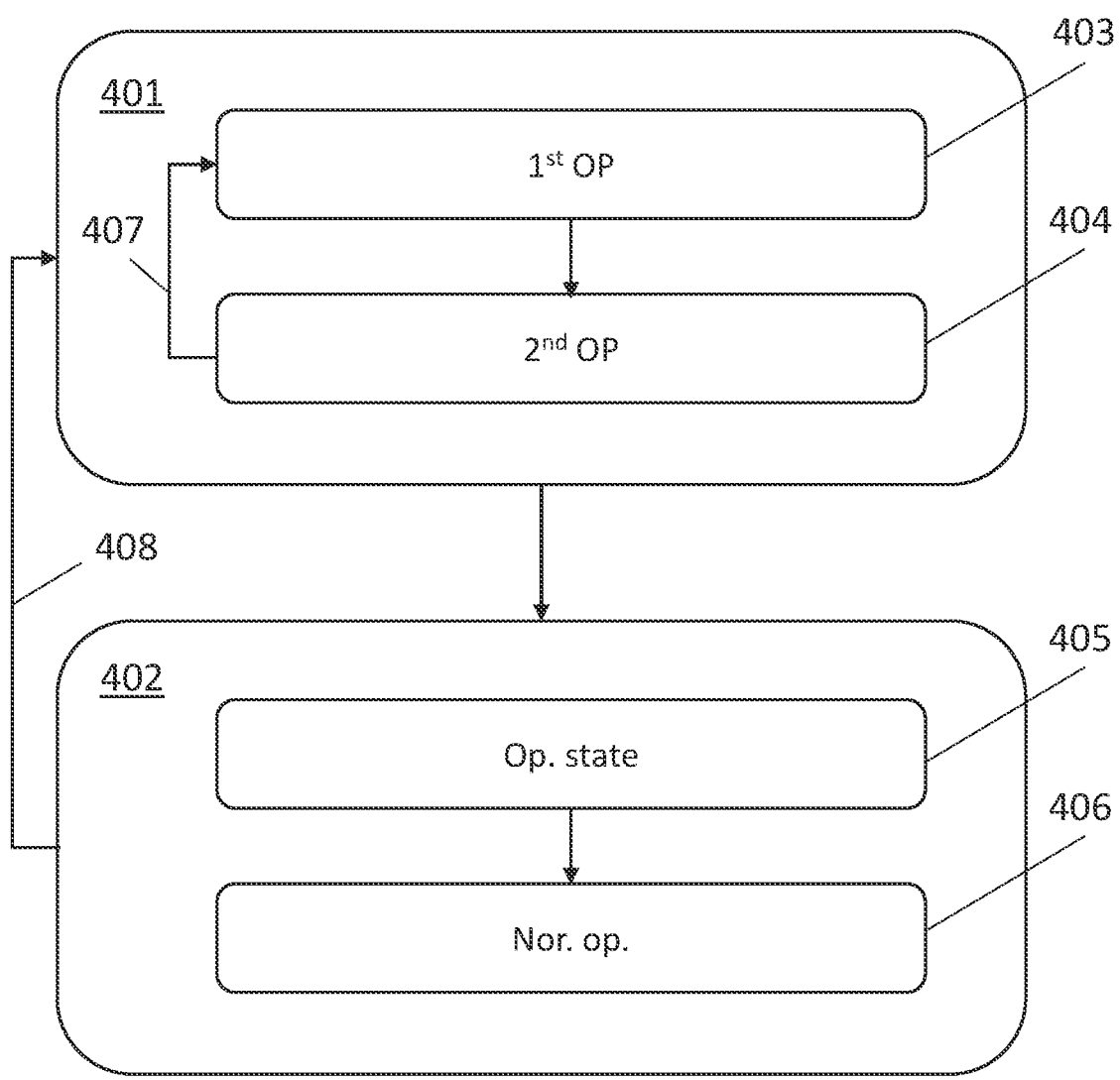
FIG. 4 illustrates the operation of the wind turbine.

FIG. 4 illustrates an example operation of the wind turbine. The wind turbine may be in a non-producing operation mode 401 or in a power producing operation mode 402. When in the non-producing operation mode 401, the first operational parameter is monitored 403, when the first operational parameter is becoming larger than the nominal cut-in value; the second operational parameter is monitored 404. When the second operational parameter is higher than the connection cut-in value, the mode of the wind turbine shifts to a power producing operation mode. In the power producing operation mode the operational state of the wind turbine is monitored 405 and if a time-out period expires, the wind turbine shifts to normal operation 406.

In the non-producing operation mode 401, when monitoring the second operational parameter 404, a cut-in transition 407 may occur and the wind turbine shifts back to monitor the first operational parameter. When in power producing operation mode 402 a cut-out transition 408 may occur and the wind turbine shifts back to non-producing operation mode 401 where it starts with monitoring the first operational parameter 403.

Figure 5:
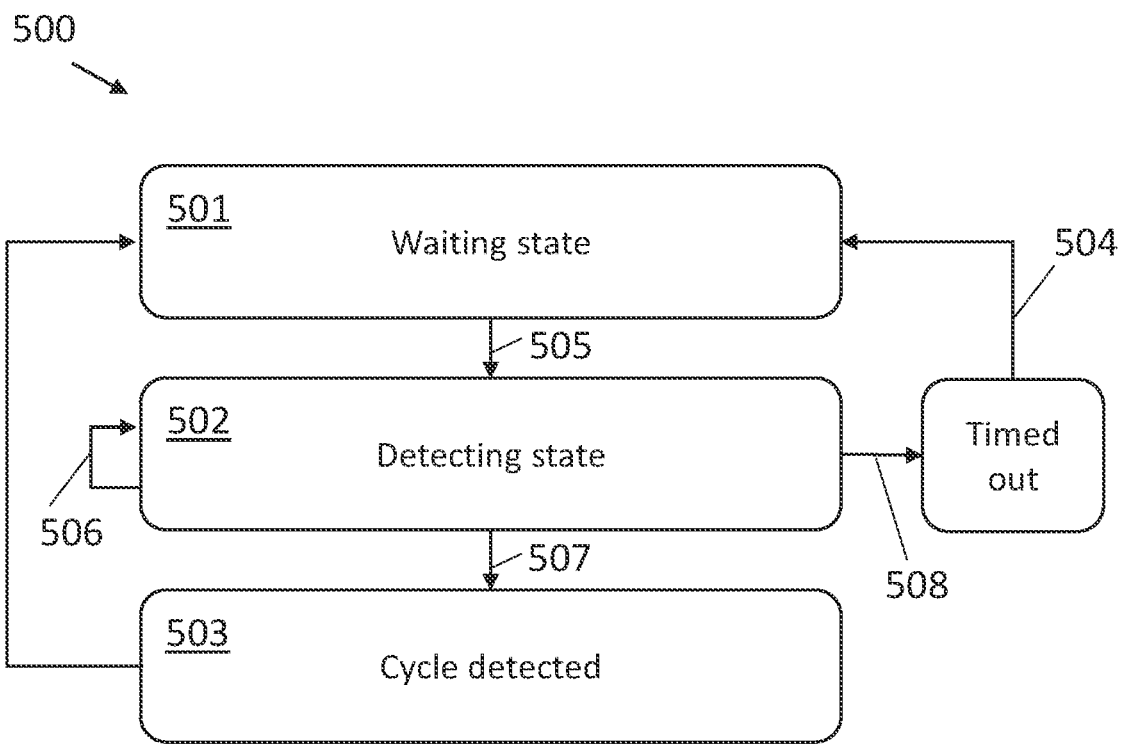
FIG. 5 illustrates a cut-in limit cycle state machine for controlling the cut-in limit cycle.
Figure 6:
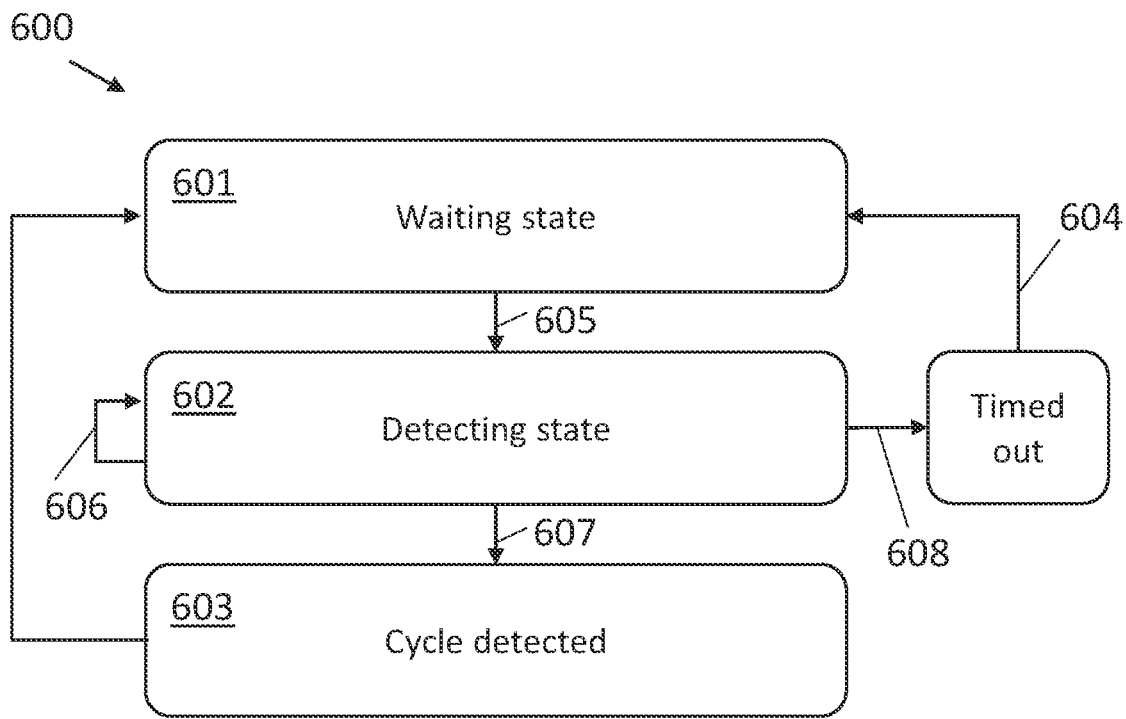
FIG. 6 illustrates a connection limit cycle state machine for controlling the connection limit cycle.

In embodiments, the method of the invention may be implemented by the use of state machines to monitor the limit cycles. Monitoring the limit cycles by use of state machines is illustrated in FIGS. 5 and 6. FIG. 5 illustrates a cut-in limit cycle state machine 500 for controlling the cut-in limit cycle. The cut-in limit cycle state machine is keeping track of the number of cut-in transitions and detects cut-in limit cycles.

The state machine is active whenever an event happens that make the cut-in limit cycle state machine change state. In the waiting state 501, the state machine waits for a cut-in transition to happen. Cut-in transitions happens when the wind turbine is attempting to start up because the first operational parameter, typically the wind speed, is higher than the nominal cut-in value, but the wind turbine is unable to reach the second operational parameter, typically the rotor speed, to reach the connection cut-in value before a start-up time period expires. If after the first operational parameter reaches the nominal cut-in value and the second operational parameter is not reaching the connection cut-in value within the start-up time period, a cut-in transition occurs 505. Then the state of the cut-in limit cycle state machine 500 changes to the detecting state 502. In the detecting state 502, the cut-in counter is increased by 1 and the cut-in limit cycle timer is running. Whenever a cut-in transition occurs 506 the detecting state repeats itself. If the cut-in counter becomes larger than the cut-in cycle maximum 507, because there has been more cut-in transitions than allowed according to the setting of the cut-in cycle maximum, the state machine 500 changes state to the cut-in limit cycle detected state 50. In the cut-in limit cycle detected state the nominal cut-in value is increased, and the state machine returns to the waiting state 501. If, when in the detecting state 502, a time-out occurs 508 by the cut-in limit cycle timer timing out, the state machine goes to the timed out state 504, and then to the waiting state 501.

FIG. 6 illustrates a connection limit cycle state machine 600 for controlling the connection limit cycle. The connection limit cycle state machine is keeping track of the number of cut-out transitions and detects connection limit cycles. The state machine is active whenever an event happens that makes the connection limit cycle state machine change state. In the waiting state 601, the state machine waits for a cut-out transition to happen. Cut-out transitions 605 happens when the wind turbine is producing power in the power producing operation mode, but then are falling out and it no longer producing power. Then the state of the connection limit cycle state machine 600 changes to the detecting state 602. In the detecting state 602, the cut-out counter is increased by 1 and the connection limit cycle timer is running. Whenever a cut-out transition occurs 606 the detecting state repeats itself. If the cut-out counter becomes larger than the connection cycle maximum 607, because there has been more cut-out transitions than allowed according to the setting of the connection cycle maximum, the state machine 600 changes state to the connection limit cycle detected state 603. In the connection limit cycle detected state, the connection cut-in value is increased, and the state machine returns to the waiting state 601. If when in the detecting state 602 a time-out occurs 608 by the connection limit cycle timer timing out, the state machine goes to the timed out state 604 and then to the waiting state 601.

Figure 7:
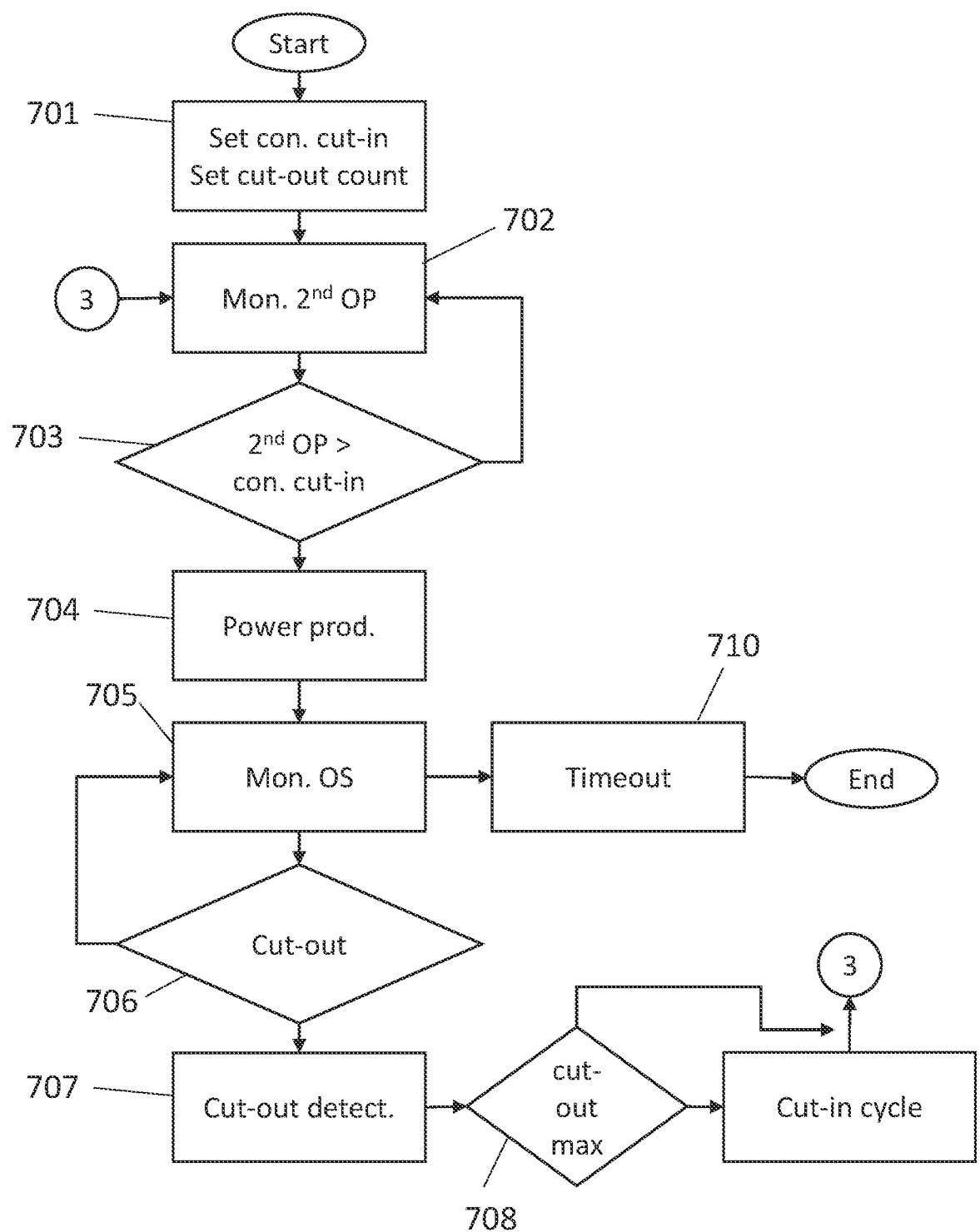
FIG. 7 illustrates controlling the wind turbine only by the connection limit cycles according to the second aspect of the invention.

FIG. 7 illustrates an embodiment where the wind turbine is controlled only by the connection limit cycles according to the second aspect of the invention. In step 701, the second operational parameter is set to the connection cut-in value, and the cut-out counter for counting cut-out transitions is set to zero. Then in step 702 the second operational parameter is monitored. In addition, if, in 703, the second operational parameter becomes larger than the connection cut-in value, then in step 704, the wind turbine is entering the power producing operation mode. When in power production mode the operational state of the wind turbine is monitored in step 705, and if, in 706, a cut-out transition is detected, then, in step 707, one is added to the cut-out counter. If 708 the cut-out counter is larger than the connection cycle maximum, then a connection limit cycle is detected and in step 709 the connection cut-in value is increased and the cut-out counter is reset to zero, prepared to detect another connection limit cycle. Whether a connection limit cycle is detected or not, after detecting a cut-out transition the control returns to step 702 for monitoring the second operational parameter awaiting a new opportunity to enter the power producing operation mode. If the wind turbine is producing power, and after a timeout-period not have detected any cut-out transition, meaning that no fall-out of production has been detected. Then, a timeout occurs, and in step 710, the wind turbine is producing power in a stable manner, and no more special start-up control is needed. Therefore, the connection cut-in value are reset to its initial value and the wind turbine enters normal operation.

The invention can be implemented by means of hardware, software, firmware or any combination of these. The invention or some of the features there of can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. In addition, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for operating a wind turbine during start-up from a non-producing operation mode to a power producing operation mode, the method comprising:
    a) setting a nominal cut-in value of a first operational parameter and a connection cut-in value of a second operational parameter of the wind turbine;
    b) monitoring the first operational parameter;
    c) initiating start-up of the wind turbine when the monitored first operational parameter is higher than the nominal cut-in value;
    d) monitoring the second operational parameter;
    e) detecting a cut-in transition if the value of the second operational parameter is not reaching the connection cut-in value within a start-up time period or the first operational parameter falls below the nominal cut-in value;
    f) detecting a cut-in limit cycle of the wind turbine if more than a threshold number of counted cut-in transitions has been detected, and if a cut-in limit cycle is detected, increase the nominal cut-in value; and
    g) repeating steps b)-f) until the second operational parameter reaches the connection cut-in value.

2. The method of claim 1, wherein the method further comprises:
    h) entering a power producing operation mode of the wind turbine upon reaching the connection cut-in value of the second operational parameter;
    i) monitoring an operational state of the wind turbine;
    j) detecting a cut-out transition upon transition into a non-producing operation mode or within a connection time period after transition into a non-producing operation mode not reaching a power producing operation mode;
    k) detecting a connection limit cycle of the wind turbine if more than a threshold number of counted cut-out transitions has been detected, and if a connection limit cycle is detected, increase the connection cut-in value;
    l) repeating step b)-f) after detecting a cut-out transition until the second operational value reaches the connection cut-in value;
    m) entering a power producing operation mode of the wind turbine; and
    n) repeating steps i)-l) until no cut-out transition has been detected within a timeout-period after which the wind turbine enters normal operation.

3. The method of claim 2, wherein the method further comprises resetting the nominal cut-in value to its initial value upon detecting a connection limit cycle and the connection cut-in value is lower than a connection threshold.

4. The method of claim 3, wherein the method further comprises increasing the nominal cut-in value upon detecting a connection limit cycle and the connection cut-in value is higher than or equal to the connection threshold.

5. The method of claim 2, wherein the method further comprises setting the connection cut-in value to a connection threshold upon detecting a connection limit cycle of the wind turbine and the connection cut-in value is higher than or equal to the connection threshold.

6. The method of claim 2, wherein the method further comprises:
   o) setting a connection cut-in value of a second operational parameter of the wind turbine;
   p) monitoring the second operational parameter;
   q) entering a power producing operation mode of the wind turbine upon reaching the connection cut-in value of the second operational parameter;
   r) monitoring the operational state of the wind turbine;
   s) detecting a cut-out transition upon transition into a non-producing operation mode or within a connection time period after transition into a non-producing operation mode not reaching a power producing operation mode;
   t) detecting a connection limit cycle of the wind turbine if more than a threshold number of counted cut-out transitions has been detected, and if a connection limit cycle is detected, increase the connection cut-in value; and
   u) repeating steps p)-t) until no cut-out transition has been detected within a timeout-period after which the wind turbine enters normal operation.

7. The method of claim 1, wherein the method further comprises setting the nominal cut-in value to a nominal threshold upon detecting a cut-in limit cycle of the wind turbine and the nominal cut-in value is higher than or equal to the nominal threshold.

8. The method of claim 1, wherein the method further comprises resetting the nominal cut-in value and the connection cut-in value to their initial values when no cut-out transition has been detected within a timeout-period after which the wind turbine enters normal operation.

9. The method of claim 1, wherein the counted cut-in transitions is reset to zero when a cut-in limit cycle is detected or a cut-in limit cycle timer times out.

10. The method of claim 2, wherein the counted cut-out transitions is reset to zero when a connection limit cycle is detected or a connection limit cycle timer times out.

11. The method of claim 1, wherein the first operational parameter is the wind speed or a rotor speed, and the second operational parameter is the rotor speed.

12. The method of claim 1, wherein when the first operational parameter is the wind speed and the nominal cut-in value is initially set to 3, 4 or 5 m/s and when the first operational parameter is increased, it is increased with 1 m/s steps.

13. The method of claim 1, wherein when the second operational parameter is a rotor speed, the connection cut in value is initially set to 0.5, 1, or 1.2 rpm and when the second operational parameter is increased, it is increased with 2.5% steps.

14. The method of claim 1, wherein the threshold number of cut-out transitions is 2, 3, 4, 5, 6 or 7.

15. The method of claim 1, wherein a timeout-period after which the wind turbine enters normal operation is 2, 3, 4, 5 or 6 hours.

16. A control system, comprising:
an input/out interface; and
one or more processors configured to perform an operation for operating a wind turbine system during start-up, the operation, comprising:
   a) setting a nominal cut-in value of a first operational parameter and a connection cut-in value of a second operational parameter of the wind turbine;
   b) monitoring the first operational parameter;
   c) initiating start-up of the wind turbine when the monitored first operational parameter is higher than the nominal cut-in value;
   d) monitoring the second operational parameter;
   e) detecting a cut-in transition if the value of the second operational parameter is not reaching the connection cut-in value within a start-up time period or the first operational parameter falls below the nominal cut-in value;
   f) detecting a cut-in limit cycle of the wind turbine if more than a threshold number of counted cut-in transitions has been detected, and if a cut-in limit cycle is detected, increase the nominal cut-in value; and
   g) repeating steps b)-f) until the second operational parameter reaches the connection cut-in value.

17. A wind turbine system, comprising:
a tower;
a nacelle disposed on the tower;
a rotor extending from the nacelle and having a plurality of blades disposed at a distal end of the rotor; and
a control system for operating a wind turbine system during start-up, the control system configured to perform an operation, comprising:
   a) setting a nominal cut-in value of a first operational parameter and a connection cut-in value of a second operational parameter of the wind turbine;
   b) monitoring the first operational parameter;
   c) initiating start-up of the wind turbine when the monitored first operational parameter is higher than the nominal cut-in value;
   d) monitoring the second operational parameter;
   e) detecting a cut-in transition if the value of the second operational parameter is not reaching the connection cut-in value within a start-up time period or the first operational parameter falls below the nominal cut-in value;
   f) detecting a cut-in limit cycle of the wind turbine if more than a threshold number of counted cut-in transitions has been detected, and if a cut-in limit cycle is detected, increase the nominal cut-in value; and
   g) repeating steps b)-f) until the second operational parameter reaches the connection cut-in value.

18. A computer program product comprising software code adapted to control a wind turbine system when executed on a data processing system, the computer program product being adapted to perform an operation, comprising:
   a) setting a nominal cut-in value of a first operational parameter and a connection cut-in value of a second operational parameter of the wind turbine;
   b) monitoring the first operational parameter;
   c) initiating start-up of the wind turbine when the monitored first operational parameter is higher than the nominal cut-in value;
   d) monitoring the second operational parameter;
   e) detecting a cut-in transition if the value of the second operational parameter is not reaching the connection cut-in value within a start-up time period or the first operational parameter falls below the nominal cut-in value;

f) detecting a cut-in limit cycle of the wind turbine if more than a threshold number of counted cut-in transitions has been detected, and if a cut-in limit cycle is detected, increase the nominal cut-in value; and g) repeating steps b)-f) until the second operational parameter reaches the connection cut-in value.

* * * * *